(12) United States Patent
Bloomfield

(10) Patent No.: US 6,370,552 B1
(45) Date of Patent: *Apr. 9, 2002

(54) APPARATUS AND METHOD FOR DISPLAYING APPLICATION OUTPUT IN AN HTML DOCUMENT

(75) Inventor: Marc A. Bloomfield, Pompano Beach, FL (US)

(73) Assignee: Citrix Systems, Inc., Fort Lauderdale, FL (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/855,977

(22) Filed: May 14, 1997

(51) Int. Cl.[7] ............................................. G06F 15/00
(52) U.S. Cl. .................... 707/513; 707/501.1; 709/217; 345/759; 345/803
(58) Field of Search ................................. 707/513, 501, 707/501.1; 345/335, 340, 759, 803; 395/200.57, 200.58; 709/203, 217, 219

(56) References Cited

U.S. PATENT DOCUMENTS

| 4,499,499 A | 2/1985 | Brickman et al. | 358/263 |
| 4,937,784 A | 6/1990 | Masai et al. | 709/104 |
| 5,014,221 A | 5/1991 | Mogul | 358/1.14 |

(List continued on next page.)

FOREIGN PATENT DOCUMENTS

| EP | 0 384 339 | 8/1990 | |
| EP | 0483576 A2 | 5/1992 | G06F/15/40 |
| EP | 0 648 038 | 4/1995 | |
| EP | 0648038 A2 | 4/1995 | |
| EP | 0732834 A2 | 9/1996 | H04L/29/06 |
| WO | WO 98/52320 | 11/1998 | H04L/12/00 |
| WO | WO 98/52344 | 11/1998 | |

OTHER PUBLICATIONS

Dick Oliver, Netscape 2 Unleashed, Sams.net Publishing, pp. 261–263, Feb. 1996.*
"Distributed Coordination Models for Client/Server Computing" Richard M. Adler, Apr., 1995 Computer Magazine pp. 14–22.
PCT/US98/09879 Copy of Transmission of PCT Chapter II Demand.
Chu, J.M. et al.; Behavior Research Methods, Instruments & Computers; "Creating a Hypertext Markup Language Documents for an Information Server"; vol. 27, No. 2, pp. 200–205 (Jan. 1, 1995).
Droms, R., "Dynamic Host Configuration Protocol", Network Working Group Request for Comments; 1541, Oct. 1993, pp. 1–39.
Hoff, A. "Java and Internet Programming", *Dr. Dobb's Journal*, pp. 56, 58, 60–61 and 101–102, Aug., 1995.

(List continued on next page.)

Primary Examiner—Heather R. Herndon
Assistant Examiner—Cong-Lac Huynh
(74) Attorney, Agent, or Firm—Testa, Hurwitz & Thibeault, LLP

(57) ABSTRACT

A method for displaying an executing application in an HTML page includes the steps of receiving an indication that execution of an application should begin, determining the parameters of a window in which the executing application will be displayed, creating a communication channel to the HTML page using the determined window parameters, and displaying the output of the application, which is executing on a server, in the window via the communications channel. A related apparatus includes a parameter handler and a network executive. The parameter handler determines the parameters of the application window and passes the parameters to a network executive. The network executive uses the parameters to begin execution of the desired applications program on a server and causes the output of the program to be displayed in the window.

19 Claims, 7 Drawing Sheets

U.S. PATENT DOCUMENTS

| | | | |
|---|---|---|---|
| 5,233,701 A | | 8/1993 | Nakata ......................... 395/425 |
| 5,249,290 A | | 9/1993 | Heizer ........................... 709/105 |
| 5,325,527 A | | 6/1994 | Cwikowski et al. ......... 709/222 |
| 5,329,619 A | | 7/1994 | Page et al. .................... 709/203 |
| 5,341,478 A | | 8/1994 | Travis, Jr. et al. ........... 709/203 |
| 5,367,623 A | * | 11/1994 | Iwai et al. .................... 345/776 |
| 5,367,688 A | | 11/1994 | Croll ............................ 395/700 |
| 5,408,655 A | * | 4/1995 | Oren et al. ................. 707/501.1 |
| 5,414,457 A | | 5/1995 | Kadowaki et al. ......... 348/14.03 |
| 5,473,599 A | | 12/1995 | Li et al. ......................... 370/16 |
| 5,485,460 A | | 1/1996 | Schrier et al. ............... 370/94.1 |
| 5,499,343 A | | 3/1996 | Pettus ........................ 395/200.2 |
| 5,515,508 A | | 5/1996 | Pettus et al. .................. 709/203 |
| 5,530,852 A | | 6/1996 | Meske, Jr. et al. ........... 709/206 |
| 5,535,422 A | * | 7/1996 | Chiang et al. ................ 345/709 |
| 5,537,546 A | | 7/1996 | Sauter .......................... 709/230 |
| 5,548,726 A | | 8/1996 | Pettus ...................... 395/200.09 |
| 5,553,242 A | | 9/1996 | Russell et al. ................ 709/227 |
| 5,557,732 A | | 9/1996 | Thompson .................... 395/161 |
| 5,561,769 A | | 10/1996 | Kumar et al. ............ 395/200.05 |
| 5,572,643 A | | 11/1996 | Judson .......................... 709/218 |
| 5,572,674 A | | 11/1996 | Ernst ............................ 709/221 |
| 5,579,469 A | | 11/1996 | Pike ............................. 345/781 |
| 5,596,745 A | | 1/1997 | Lai et al. ...................... 395/614 |
| 5,606,493 A | | 2/1997 | Duscher et al. ............... 364/134 |
| 5,623,656 A | | 4/1997 | Lyons ........................... 707/10 |
| 5,644,720 A | | 7/1997 | Boll et al. ..................... 709/227 |
| 5,657,390 A | | 8/1997 | Elgamal et al. ................ 380/49 |
| 5,680,549 A | | 10/1997 | Raynak et al. ........... 395/200.12 |
| 5,701,451 A | | 12/1997 | Rogers et al. ................ 395/600 |
| 5,706,437 A | | 1/1998 | Kirchner et al. ........ 395/200.12 |
| 5,710,918 A | | 1/1998 | Lagarde et al. ............... 395/610 |
| 5,721,876 A | | 2/1998 | Yu et al. ....................... 395/500 |
| 5,734,865 A | | 3/1998 | Yu ................................ 395/500 |
| 5,754,830 A | | 5/1998 | Butts et al. ................... 395/500 |
| 5,761,507 A | | 6/1998 | Govett ......................... 395/684 |
| 5,764,915 A | | 6/1998 | Heimsoth et al. ........ 395/200.57 |
| 5,802,258 A | | 9/1998 | Chen ........................ 395/182.08 |
| 5,802,306 A | | 9/1998 | Hunt ......................... 395/200.58 |
| 5,812,784 A | | 9/1998 | Watson et al. ........... 395/200.57 |
| 5,826,027 A | | 10/1998 | Pedersen et al. ......... 395/200.51 |
| 5,828,840 A | | 10/1998 | Cowan et al. ............ 395/200.33 |
| 5,838,300 A | * | 11/1998 | Takagi et al. ................. 345/145 |
| 5,877,757 A | * | 3/1999 | Baldwin et al. .............. 345/336 |
| 5,920,311 A | * | 7/1999 | Anthiias ....................... 345/329 |
| 5,938,733 A | | 8/1999 | Heimsoth et al. ............. 709/230 |
| 5,940,075 A | * | 8/1999 | Mutschler, III et al. ...... 345/335 |
| 5,941,949 A | * | 8/1999 | Pederson ....................... 709/227 |
| 5,941,988 A | | 8/1999 | Bhagwat et al. .............. 713/201 |
| 5,951,694 A | | 9/1999 | Choquier et al. .............. 714/15 |
| 5,961,586 A | * | 10/1999 | Pederson ...................... 709/201 |
| 5,978,848 A | * | 11/1999 | Maddalozzo, Jr. et al. . 709/227 |
| 6,157,944 A | * | 11/1999 | Pederson ...................... 709/204 |
| 6,026,474 A | * | 2/2000 | Carter et al. .................. 711/202 |
| 6,088,515 A | | 7/2000 | Muir et al. ............. 395/200.47 |
| 6,115,039 A | * | 9/2000 | Karren et al. ................ 345/335 |
| 6,226,655 B1 | * | 5/2001 | Borman et al. ........... 707/501.1 |

OTHER PUBLICATIONS

Holtzman, Jeff, "Merge 386", Byte, Dec. 1988, pp. 207, 208, 211, 212.

Putz, S. "Interactive Information Services Using Word–Wide Web Hypertext", Computer Networks and ISDN Systems, Elsevier Science B.V., vol. 27, p. 273–280, 1994.

Singleton, A.; Byte; "Wired On The Web"; pp. 77–78, 80 (Jan. 1, 1996).

Tessier, T.; *Dr. Dobb's Journal*, "Using Javascript to Create Interactive Web Pages A Cross–Platform Object Scripting Language", pp. 84, 86–89, 96–97 (Mar. 1, 1996).

*Windows NT Networking Guide: Microsoft Windows NT Resource Kit*, Microsoft Press 1995, pp. 79–87.

P. Davis; Database; "An Interactive Hypermedia Map Viewer"; vol. 18, No. 2, pp. 65–67 (Apr./May, 1995).

Andrew S. Tanenbaum, *Computer Networks*, Second Edition, pp. 434–435, Prentice Hall P T R, Englewood Cliffs, New Jersey.

*Distributed Systems Concepts And Design*, second edition, George Coulouris, Jean Dollimore, Tim Kindberg, Queen Mary and Westfield College, University of London, Addison–Wesley 1994.

*Windows NT Networking Guide: Microsoft Windows NT Resource Kit*, pp. 79–87, (1995).

Schemers, III, R.J., "Ibnamed: a load balancing name server written in Perl—Update," , http://www–leland.stanford.edu/~ docs/ibnamed.html, pp. 1–5, (Sep. 17, 1995).

"OS/2 EE Database manager SQLJRA Remote Protocol," *IBM Technical Disclosure Bulletin*, vol. 36, No. 1, pp. 33–36, (Jan., 1993).

Mann, Bruce E. et al., "Terminal Servers on Ethernet Local Area Networks," *Digital Technical Journal*, No. 3, pp. 73–87, (Sep., 1986).

\* cited by examiner

APPARATUS AND METHOD FOR DISPLAYING APPLICATION OUTPUT IN AN HTML DOCUMENT

FIELD OF THE INVENTION

The present invention relates the display of information in a communications network and more specifically to displaying the output of executing application programs in an HTML file, e.g. a Web page.

BACKGROUND OF THE INVENTION

The worldwide network of computers commonly known as the "Internet" has seen explosive growth in the last several years. Much of this growth has been driven by the increase in popularity of the World Wide Web (WWW). The WWW is a collection of files written using HyperText Markup Language (HTML), commonly referred to as "Web pages." HTML files may be accessed and displayed using specialized applications known as "web" browsers, which allow a user to access HTML files using a simple graphical user interface (GUI).

Servers hosting HTML files can communicate using the Hypertext Transfer Protocol (HTP). HTTP is an application protocol that provides users access to files (which can be in different formats such as text, graphics, images, sound, video, etc.) using the HTML page description language. HTML provides basic document formatting and allows the developer to specify communication "links" to other servers and files. Use of an HTML-compliant client browser involves specification of a link via a Uniform Resource Locator or "URL. " Upon such specification, the client makes a TCP/IP request to the server identified in the link and receives a "Web page" in return. Further, organizations can provide HTML files that are accessible from within the organization but not from the WWW. These internal networks and collections of HTML files are commonly referred to as "Intranets."

A file written using HTML includes "tags," which indicate to a browser displaying the file when special action should be taken. For example, a tag may indicate to the browser: (1) that a graphics file should be displayed at a particular point in the document; (2) that certain text should centered, bolded, or otherwise formatted; (3) that the background of a document should be shaded or have a particular pattern; or (4) that a different HTML should be loaded in place of the HTML the browser is currently displaying.

The popularity of the World Wide Web and other HTML applications has attracted marketing and sales efforts from a broad range of companies representing a wide range of industries. As differentiation from other companies becomes increasingly difficult, many companies have attempted to overcome HTML's inherently static nature. Also, organizations utilizing HTML files as a method of sharing information have recognized that an Intranet is a useful method for providing various users with access to more than just information. Unfortunately, HTML files are inherently static.

ActiveX objects are one attempt to provide HTML files with the ability to display executing applications. An ActiveX object is a data object which can be used with browsers that have an ActiveX interface. An obvious drawback of these objects is that if a user's browser does not have an ActiveX interface then it cannot display the executing application. This limits the utility of ActiveX objects since a primary objective of most HTML pages is to be viewed by as many users as possible.

A programming language called JAVA also has been proposed as a way to allow executable code to be added to an HTML file. Since JAVA is a language, it does not require a specific browser interface and has a potentially broader audience. However, a JAVA program, usually called an applet, is downloaded to the client before executing. This may be problematic for clients lacking sufficient memory to download the applet and, even if the client has enough memory, requires the client to wait for the applet to download. Further, since JAVA is itself a programming language, existing applications must be rewritten in the JAVA language before they can be embedded in a Web page.

SUMMARY OF THE INVENTION

The present invention relates to a method for displaying an executing application in a displayed HTML file without requiring the application to be rewritten in a special language and without requiring the viewing user's browser to support a specialized interface. The application executes on the server, mitigating download time and client-side memory restrictions. Further, a client may invoke execution of multiple applications for multiple pages and travel between the HTML documents without terminating any of the applications.

In one aspect, a method for displaying an executing application in an HTML page begins by receiving an input from a user which signals that the user wants execution of an application program to begin. Parameters of the window in which the application will execute are determined, and a communication channel to the applications window in the HTML page is created. The output of the application program, which is executing on a server, is displayed in the applications window via the communications channel.

In another aspect, an apparatus for displaying an executing application in an HTML page comprises a parameter handler and a network executive. The parameter handler receives parameters that are associated with an application execution window included in an HTML file. The parameter handler receives parameters from the parameter handler, causes execution of an application program on a server to begin, and displays the output of the executing application in the application execution window based on the parameters received by the network executive from the parameter handler.

In another aspect, an article of manufacture has computer-readable code means for displaying an executing application in an HTML page embodied thereon. The article of manufacture includes computer-readable code means for receiving an input from a client which signals that execution of an application program on a server should begin. The article of manufacture also includes computer-readable code means for determining the parameters of the window in which the executing application will be displayed. Also included is computer-readable code means for creating a communications channel to the HTML page using the determined parameters and computer-readable code means for displaying the output of an application executing on a server in the application window via the communications channel.

In still another aspect a system for embedding an application in an HTML page includes a server, a network executive, a parameter handler, and an HTML file. The server stores and executes application programs. The network executive sends commands to the server indicating that execution of a specific application should begin and the network executive receives output from applications executing on the server. The parameter handler receives parameters and passes them to the network executive. The HTML file includes an application window. The application window passes window parameters to the parameter handler and receives application program output from the network executive.

BRIEF DESCRIPTION OF THE DRAWINGS

This invention is pointed out with particularity in the appended claims. The advantages of this invention described above, as well as further advantages, may be better understood by referring to the following description taken in conjunction with the accompanying drawings, in which:

DETAILED DESCRIPTION OF THE INVENTION

Figure 1:
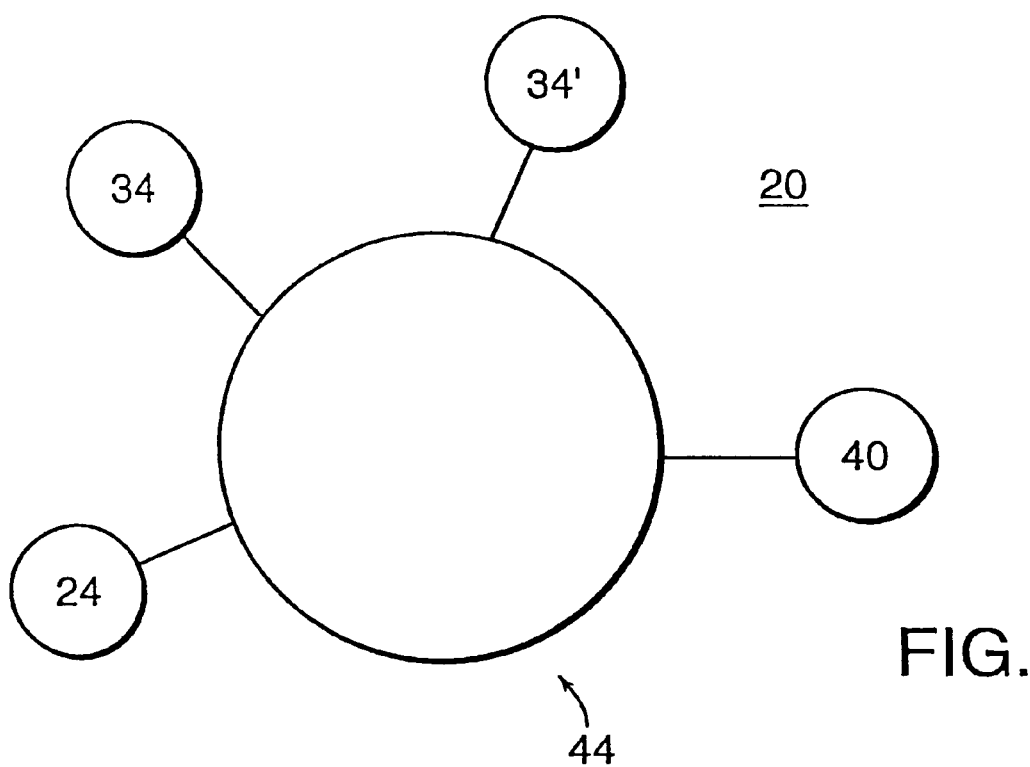
FIG. 1 is a highly schematic diagram of an embodiment of a communication system utilizing the invention.

Referring now to FIG. 1, in brief overview, a typical network 20 includes at least one client node 24, at least one server node 34, 34', and a master network information node 40 connected together by a communications link 44. The embodiment shown in FIG. 1 depicts the communications link 44 as a local area network ring or LAN ring, but any communication topology may be used. For the purpose of explanation the server node 34 is assumed to have the application requested by the client node 24. Also, for the purpose of explanation, the master network information node 40 is assumed to be a distinct server node, but in actuality the master network information node 40 may be an application execution server node 34. It should be noted that on a given LAN several nodes may be capable of acting as a network information node, but at any one time only one of such nodes is designated the master network information node 40 for the system 20 and it is to this node that client requests for server information are directed.

The master network information node 40 maintains a table of addresses for the application execution server nodes 34, 34'. In addition, the master network information node 40 receives messages from each application execution server node 34, 34' indicating its level of activity. The level of activity of the application execution server nodes 34, 34' is maintained in a table along with the address of each of the application execution server nodes 34 and is used by the communications system 44 for load leveling.

When the client 24 wishes to have an application executed on an application execution server node 34, the client node 24 sends a request to the general communications port previously defined by the communications protocol or to the "well-known" communications port on the master network information node 40. In one embodiment the communication takes place by way of a datagram service. The master network information node 40 accesses the table of server addresses and returns a message containing the address of the application execution server or application server 34 which has the requested application and also which has the least load. Subsequent communications are automatically addressed by the client also to a "well-known" or predefined general communications port on the server node 34. In one embodiment, the type of protocol with which the initial query was made to the master network information node 40 determines the protocol of the information returned by the master network information node 40 to the client node 24. Thus if the request were made using a TCP/IP datagram, the master network information node 40 would return the TCP/IP address of the server 34 to the client node 24 and the client node 24 would subsequently establish contact with the server node 34 using that protocol. In another embodiment, the datagram requesting an application address by a client 24 includes a request for a different type of protocol than the one used to send the request to the master network information node 40. For example, the client 24 may make a request to the master network information node 40 using the IPX protocol and request the address of the application server as a TCP/IP protocol address.

When a client node 24 (actually a client process 56 on a client node 24) desires to communicate with an application on a server node 34, 34' the client node 24 begins by issuing a network request to determine the location of the server 34 having the desired application. This request is received by the master network information node 40 (also referred to as a network browser 40) residing somewhere on the network. In this FIG. 1, the network browser 40 is shown for simplicity as residing on a different server 40 from the server which has the application, but such may generally not be the case.

The network master information node 40 returns the network address of the server node 34 having the desired application 30 to the client node 24. The client node 24 then uses the information received from the network master information node 40 to request connection to the application executing on the specified server 34. As is described above, such a connection is first established to a "well-known" communications port and is later transferred to a specific communications port under control of a connection manager. The specific communications port is associated with the application executing on the server node 34 which then communicates with the client node 24 through the specific communications port.

Figure 2:
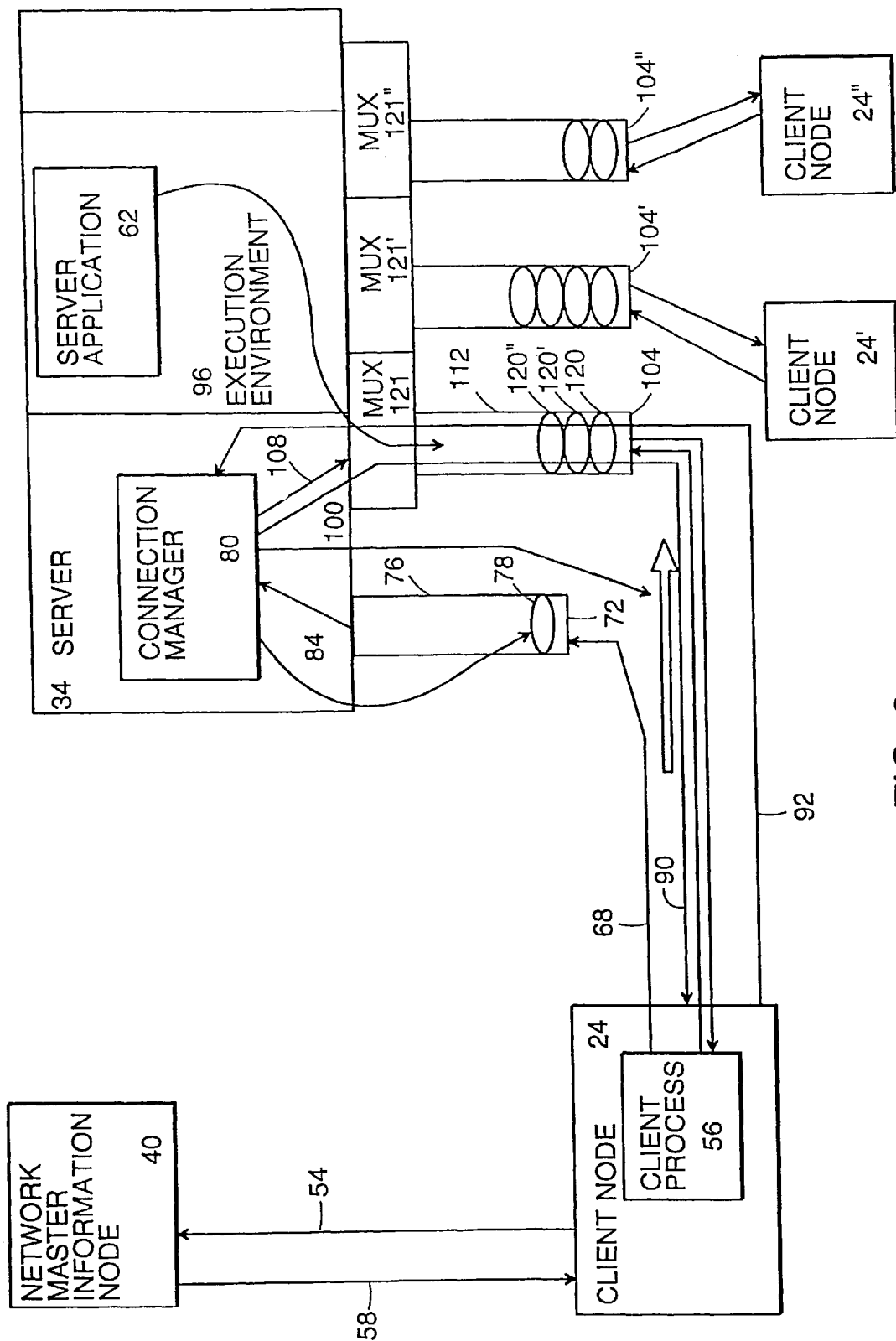
FIG. 2 is a block diagram of an embodiment of the invention showing the connections between various components of the server of FIG. 1 which occur during communication between the clients and server.

In more detail, and referring to FIG. 2, the client process 56 on client node 24 makes a request 54 to the network master information node 40 to obtain the address of a server node 34 which includes the desired application 62. The network master information node 40 returns to the client node 24 a message 58 containing the address of the server node 34 which includes the server application 62. In one embodiment, the protocol used at this point of the connection is a datagram service.

The client node 24 uses the returned address to establish a communication channel 68 with the server 34. The port number used by the client 24 corresponds to the "well-known port" in the server 34 which has been defined by the network protocol as the port by which the server 34 establishes communication connections with clients 24. The well-known port 72 has a rudimentary protocol stack 76 which includes primarily an endpoint data structure 78.

The endpoint data structure 78 points to the communication protocol stack 76 and client connection thereby establishing a unique representation or "handle" for the client 24. The endpoint data structure 78 permits the connection between the server 34 and the client 24 to be moved at will between the connection manager 80 and the various applications 62 on the server 34. The endpoint data structure 78, in one embodiment, not only contains the handle to the client 24 but may also contain other information relating to the client connection. In the embodiment shown, the application server 34 monitors activity on a specific communications system (e.g. LAN or WAN) and has initialized this minimum protocol stack 76 with only the necessary protocol modules needed to support a "TTY" communication mode. The "TTY" communication mode is a simple ASCII stream with no protocol assumptions above the transport layer. That is, there are no protocol layers for compression, encryption, reliability, framing, or or presentation of transmitted data. Thus a client node 24 seeking an application 62 running on the server 34 establishes a connection to the well-known communications port 72 with the minimum protocol set needed to support a TTY communication mode.

A connection manager 80 executing on the server node 34 is "listening" to the well-known communications port 72 for a connection request 68. When a connection request 68 is received from the client node 24, the connection manager 80 is notified 84. The connection manager 80 knows which protocol is being used based on the notification 84.

With this information the connection manager 80 creates a new minimum protocol communications stack 104, starts the execution environment 96 and binds the new minimum protocol stack 104 to the execution environment 96. In one embodiment, the server 34 includes a number of execution environments 96 which have been previously been started, but which have not been associated with a communications port. In this embodiment, the pre-connection starting of the execution environments permits a faster response time than if each execution environment 96 is started when the connection request is received from the client 24. When the execution environment 96 is started, the server application 62 requested by the client 24 is also started. In another embodiment, if the client 24 does not specify an application, either a default application is started or simply the execution environment 96 with no application is started.

The connection manager 80 then moves the client connection, including the unique client identifier or handle, from the well-known port 76 to the new minimum protocol stack 104. The connection manager 80, using the minimum protocol stack 104 sends a TTY data stream that indicates service is available. Thus, this method for detecting a client connection is independent of the port to which the connection is first established. If the client node 24 does not respond within a prescribed time period (e.g. 5 seconds) to the service available message, a resend of the "service available" message is performed by the server 34.

If the client 24 receives the message, the client 24 sends a TTY string indicating that the "service available" message was detected. The client 24 waits for the server 34 to respond and if the response is not within a prescribed time interval (e.g. 5 seconds) the client 24 resends the message. The connection manager 80 then queries 90 the client 24 asking for the client's default communication parameters. This query 90 takes the form of a message which is passed back to the client 24 and which indicates that the client 24 should respond with details regarding what protocols the client 24 would like to use in the connection.

In response, the client 24 sends a set of protocol packets 92; each packet of which is used to specify a required or optional protocol module that is being requested from the server 34. In one embodiment, the number of packets in the set is variable with one packet being sent for each protocol requested. In another embodiment, the number of packets that is being sent is included in the header of the first packet. In a third embodiment, the remaining number of packets being sent is included in the header of each packet and is decremented with each succeeding packet sent. Thus, the client 24 may respond to the query 90 by indicating that, for example, encryption and data compression will be used. In such a case, two protocol packets will be sent from the client 24 to the server 34 and, in one embodiment, the header of the first packet will indicate the number of packets as two.

Once the responses to the query 90 have been received, the connection manager 80 builds a protocol stack using protocol drivers 120, 120', 120" which correspond to the protocols requested by the client node 24. In one embodiment, the connections manager 80 places each of the required protocol drivers 120, 120', 120", corresponding to the requested client protocols (e.g. an encryption driver if encryption is desired by the client) into the protocol stack "container" 112 and links them together. This dynamic process allows a client node 24 to specify the contents of a protocol stack dynamically without requiring that the server 34 have a prior protocol stack description for a particular client node 24. Using this method, multiple clients 24 may be served by a single server, even if the separate clients 24 have vastly differing requirements for the associated communications channel. In the embodiment shown, each client 24, 24', 24" is associated with a respective communications protocol stack 104, 104' and 104". Such dynamically extensible protocol stacks are described in more detail below and in United States patent application Ser. No. 08/540,891, filed on Oct. 11, 1995 and incorporated herein by reference.

In the embodiment just discussed, the "container" 112 is a user level or kernel level device driver, such as an NT device driver. This container driver provides ancillary support for the inner protocol modules or "drivers" (generally 120) which correspond to the protocol requirements of the client node 24. This ancillary support is in the form of helper routines that, for example, aid one protocol driver to transfer data to the next driver. Alternatively, in another embodiment each protocol driver is a complete user-level or kernel-level driver in itself.

Figure 3:
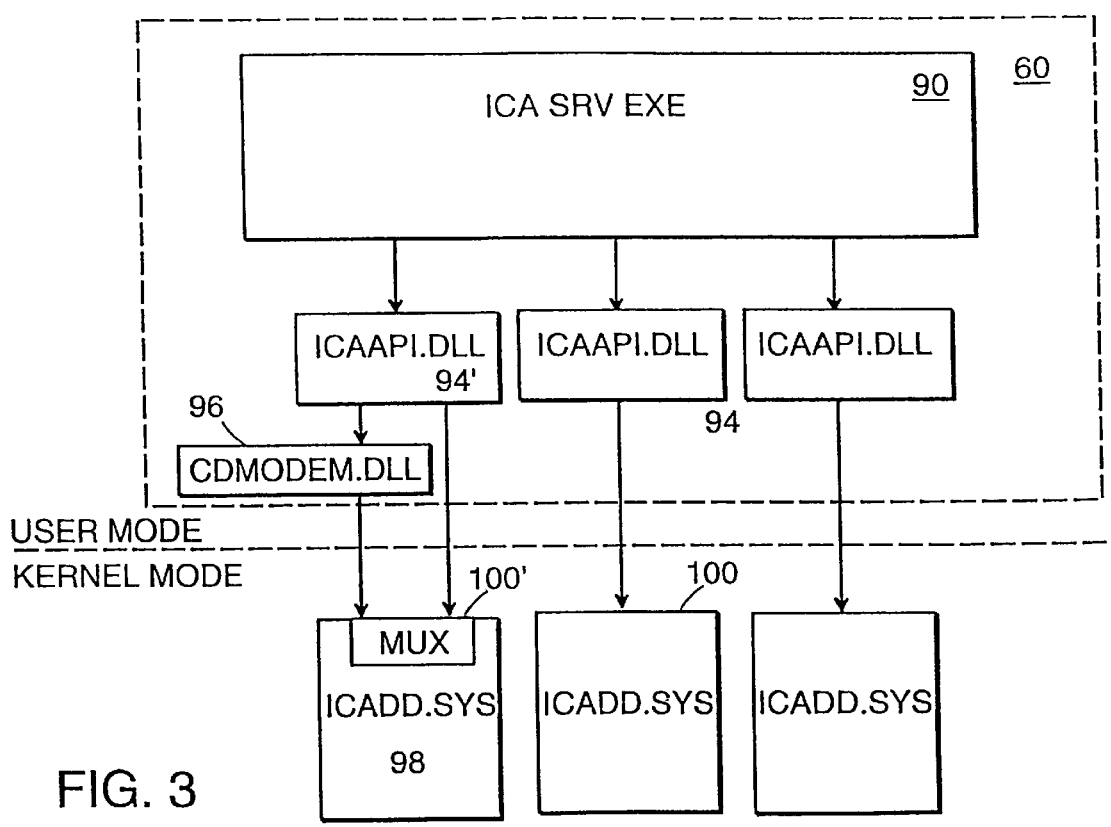
FIG. 3 is a block diagram of an embodiment of the invention that maintains and manages multiple client node connections.

Referring now to the embodiment depicted in FIG. 3, the connection manager 80 includes two main software modules: ICASRV.EXE 90 and ICAAPI.DLL 94. In the embodiment shown, ICASRV.EXE 90 is the server side of a client/server interface. ICASRV.EXE 90 manages all communications states and is, in one embodiment, implemented as a WINDOWS NT™ service. A second part of the connection manager 80 is ICAAPI.DLL 94. ICAAPI.DLL 94 establishes the connection with the client, establishes the protocols to be used and notifies ICASRV.EXE 90 of the completion of the protocol stack. In one embodiment, a third module CDMODEM.DLL 96 is linked to ICAAPI.DLL 94'. CDMODEM.DLL 96 is a module which ICAAPI.DLL 94' uses to communicate with modem devices.

The connection methodology described above can be used for a client 24 running a Web browser program. For the purposes of this specification, the user runing the Web browser program will be referred to as the "viewing user." The terms "server" or "server node" will be used to refer to machines hosting HTML files or applications that may be executed. For example, a viewing user runs a Web browser on a client node and makes file requests via the HTTP protocol to servers. The servers respond by transmitting file data to the client via the HTTP protocol. The Web browser run on the client receives the transmitted data and displays the data as an HTML page to the viewing user.

Figure 4:
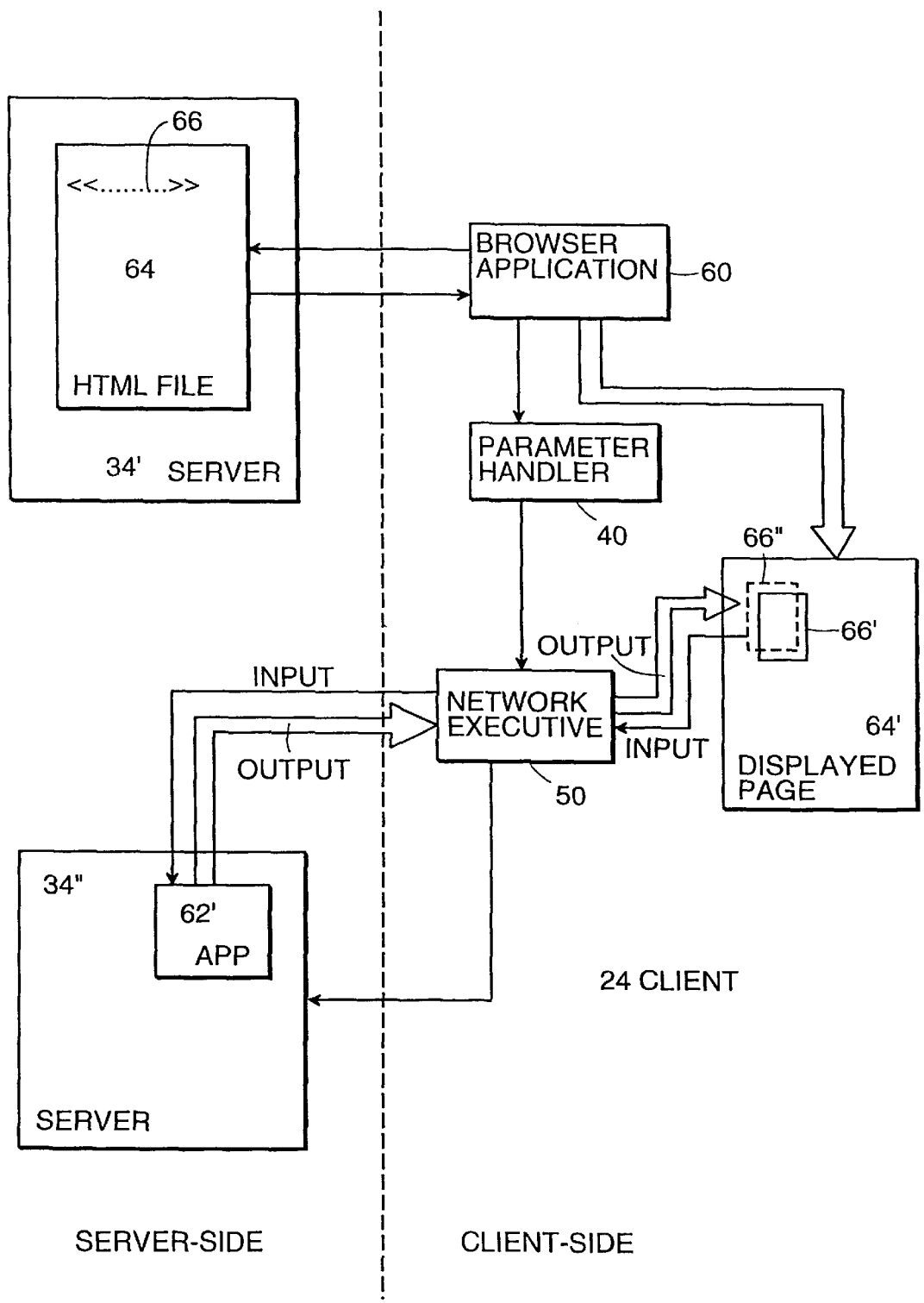
FIG. 4 is a block diagram of an embodiment of the system for embedding applications in an HTML page.

In brief overview and referring to FIG. 4, an HTML file 64 located on a server 34' and constructed in accordance with an embodiment of the invention includes a generic embedded window tag 66. The generic embedded window tag 66 is any data construct which indicates to a browser 60 displaying the HTML file 64 that a generic embedded window 66' should be displayed at a particular location in the HTML page 64' described by the HTML file 64. The generic embedded window tag 66 may include additional information, such as height of the window, width of the window, border style of the window, background color or pattern in the window, which applications may be displayed in the window, how often the output display should be updated, or any other additional information that is useful to enhance display of the application output.

Some examples of generic embedded window tags that can be embedded in an HTML file follow.

```
ActiveX tag
    <object classid="clsid:238f6f83-b8b4-11cf-8771-00a024541ee3"
        data="/ica/direct.ica" CODEBASE="/cab/wfica.cab"
        width=436 height=295>
        <param name="Start" value="Auto">
        <param name="Border" value="On">
    </object>
Netscape Plugin tag
    <embed src="http://www.citrix.com/ica/direct.ica"
        pluginspage="http://www.citrix.com/plugin.html"
        height=295 width=436 Start=Auto Border=On>
    <embed>
JAVA tag
    <applet code=JICA.class width=436 height=295>
        <param name=Address          value="128.4.1.64">
        <param name=InitialProgram   value=Microsoft Word 7.0>
        <param name=Start            value=Auto>
        <param name=Border           value=On>
    </applet>
```

In each case above, the tag indicates that a window having a height of 295 pixels and a width of 436 pixels should be drawn to receive application output. Each tag also specifies that the application should automatically start execution and that the window in which the application output is displayed should be drawn with a border. The ActiveX and Netscape Plugin tags have the remote application parameters specified in the file "direct.ica" located in the directory "/ica." The JAVA tag specifies the remote application parameters directly. In the example above, the address of the server hosting the application is specified as well as the name of the application to be executed.

The browser application 60 accesses the HTML file 64 by issuing a request to a specific Uniform Resource Locator (URL) address. The server 34' hosting the HTML file 64 transmits the HTML file 64 data to the browser application 60, which displays text and translates any tags that are included in the HTML file 64. The browser application 60 displays the HTML file 64 data as an HTML page 64'. If a generic embedded window tag 66 is present in the HTML file 64, such as one of the tags described above, the browser 60 draws a blank window 66' in the displayed HTML page 64'.

Execution of the desired application 62' may commence immediately upon display of the HTML page 64' or execution may await some signal, e.g. a specified user input which indicates execution of the application 62' should begin. Once execution of the application 62' is commenced, the browser application 60 instantiates a parameter handler 40 associated with the application window 66'. The parameter handler 40 instance may be spawned as a child process of the browser application 60, as a peer process of the browser application 60, or as a Dynamically Linked Library ("DLL") associated with the browser application 60.

The browser application 60 passes any specific parameters associated with the application window 66' that were provided by the generic embedded window 66 tag to the parameter handler 40 instance. Additionally, the browser application 60 may pass the handle for the application window 66' to the parameter handler 40 instance or the parameter handler 40 instance may query the browser application 60 to retrieve the handle for the application window 66'. The parameter handler 40 instance also spawns a network executive 50. The network executive 50 may be spawned as a child process of the parameter handler 40 instance or as a peer process of the parameter handler 40 instance.

The parameter handler 40 instance forwards any specified application window 66' parameters to the network executive 50. Parameters which are not specified by the parameter handler 40 instance or the embedded generic window tag 66 may be set to default values. The network executive 50 may have certain parameter defaults hard-coded, or the network executive 50 may access a file which contains parameter defaults.

The network executive 50 creates its own application output window 66". The network executive 50 creates its application output window 66" as a child of the displayed application window 66' and displays its application output window 66" directly over the parent window 66' drawn by the browser application 60. Since the application output window 66" drawn by the network executive 50 is a child of the application window 66' drawn by the browser application 60, the application output window 66" inherits various properties of its parent including position information. Accordingly, the application output window 66" will follow the application window 66' as the viewing user scrolls the screen of the browser application 60 or performs other actions which vary the position of the application window 66'.

The network executive 50 also establishes a communications channel with the server 34 and invokes execution of the desired application 62' by the server 34" using the connection methodology described above. The network executive 50, which acts as the client in the above description, passes any parameters it received from the parameter handler 40 instantiation to the server, along with any necessary default values. If a parameter is not passed to the server, the server may request the parameter if it is a necessary parameter which has no default value, e.g. "user id," or it may provide a default value for the parameter, e.g. execution priority. The server 34" begins execution of the desired application program 62' and directs the output to the network executive 50. The network executive 50 receives data from the application program 62' and displays the output data in its application output window 66". Since the application output window 66" is drawn on top of the application window 66' drawn by the browser application 60, the application output data is displayed in the HTML page 64'. As noted above, the application output window 66" drawn by the network executive 50 is a child of the application window 66' drawn by the browser application 60. This allows the application output window 66" to scroll as the HTML page 64' is scrolled.

The application output window 66" also receives input from the viewing user. Raw input data, e.g. a mouse click, is received into the application output window 66" by the network executive 50. The network executive 50 forwards the raw input data to the application 62' executing on the server 34". In this manner, the viewing user is able to interact with the application 62' via the HTML page 64'.

Figure 5:
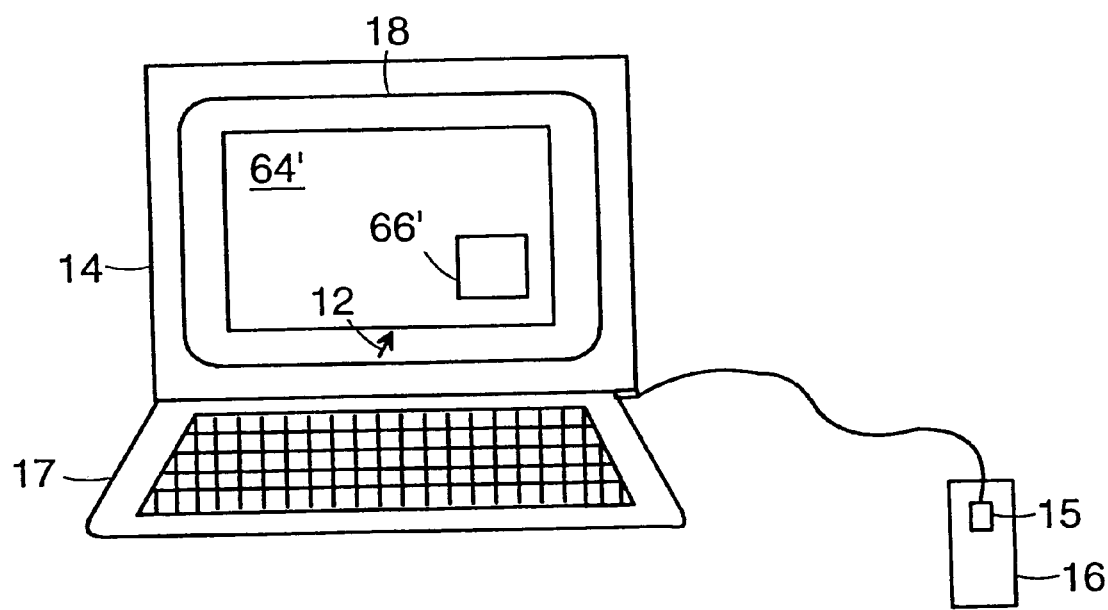
FIG. 5 is a diagrammatic view of a client node.

Referring now to FIG. 5, the viewing user uses a so-called "browser" program to display an HTML page 64' having an application window 66' on the screen 18 of the user's computer 14. The viewing user may invoke execution of an application program 62'. Typically this is done by the user utilizing a "point-and-click" interface, i.e. the viewing user uses a mouse 16 to manipulate a cursor 12 that is also displayed on the screen 18 of the viewing user's computer 14. Once the cursor 12 is over a particular portion of the HTML page 64', the viewing user signals by "clicking" a button 15 on the mouse 16. Alternatively, the viewing user may also signal by pressing a key on an associated keyboard 17, such as the "return" key. In other embodiments, the viewing user may not use a mouse 16 at all, but may instead use a touchpad, a trackball, a pressure-sensitive tablet and pen, or some other input mechanism for manipulating the cursor 12.

In another embodiment, the application window 66', or another portion of the HTML page 64', may define a "hot zone." When the viewing user moves the cursor 12 into the "hot zone," execution of the application 62' on the server 34" is started.

Once the viewing user has indicated that execution of the application 62' should commence, the browser application 60 instantiates a parameter handler 40 and passes the instantiation parameters associated with the applications window 66' by the generic embedded window tag 66. The parameter handler 40 instance spawns a network executive 50 and passes to it the parameters of the application window 66'. The network executive 50 determines which application 62' is to be invoked, and on what server 34" that application 62' resides. Generally this information is passed to it by the parameter handler 40 instance which gets it from the browser application 60 in the form of the generic embedded window tag 66, but the network executive 50 may need to query a master network information node 40 or other various servers, in order to determine which servers, if any, host the desired application 62'. The network executive 50 then begins execution of the application and displays the output of the application program 62' in the applications window 66' as described in detail above.

The network executive 50 continues to directly display application output in the applications output window 66" until the viewing user indicates that execution of the application 62' should stop, e.g. by closing the application window 66', or until the viewing user clicks on a tag indicating that a different HTML page should be displayed. When this occurs, execution of the application 62' can be terminated. It is preferred, however, is to "cache" the connection. In effect, the first parameter handler 40 instance is not immediately terminated. However, the application 62' continues executing with a reduced priority level, i.e. in "background" mode, because the first parameter handler 40 no longer has "focus".

In general, it is desirable to accomplish connection caching by providing the parameter handler 40 source code with a globally accessible data structure for registering instances. For example, the parameter handler 40 may be provided with a globally accessible linked list data structure, data array, data table, or other data structure. Because the data structure is globally available, each instance of the parameter handler 40 is able to read and write the data structure. This allows each instance of the parameter handler 40 to "register" with every other instance by writing to the data structure to signal its existence.

For embodiments in which no other connection information is stored, a predetermined limit on the number of connections that may be cached at any one time can be set. In these embodiments if registration of an instance would result in an excess number of cached connections, one of the "cached" connections is removed, i.e. the parameter handler 40 instantiation associated with that connection is notified that it should terminate. Before termination, the parameter handler 40 notifies its associated network executive 50 that it should terminate. In turn, the network executive 50 closes its session with the server hosting the application program 62' and then terminates.

In embodiments in which other information is stored, the additional information may be used to more effectively manage the cached connections. For example, if a user has not actively viewed an HTML page 64' in a predetermined number of minutes, e.g. ten minutes, the parameter handler 40 instantiation is instructed to terminate, the session with the hosting server is terminated, and the parameter handler 40 instance removes its entry in the registry.

Cached connection information may be managed using any known cache management scheme. Connection entries may be discarded on a "first in, first out" basis, i.e. the oldest entry is discarded each time a new entry must be added. Alternatively, cached connection information entries may be discarded on a "least recently used" basis, which discards information relating to connections which have been used the least amount by the user. Other cache management techniques, such as random replacement, may also be used.

If the viewing user returns to a previous HTML page 64' having a cached connection, the network executive 50 associated with the HTML page 64' is returned to the foreground, i.e., it regains "focus", and processing of the associated application resumes at a normal priority level. If necessary, the network executive 50 re-establishes the connection with the application 62'. Although no output data is stored by the network executive 50 for cached connections, as soon as a connection is re-established for an applications window 66' the connection to the application 62' is re-established and the application 62 again writes directly to the applications window 66'.

Figure 6:
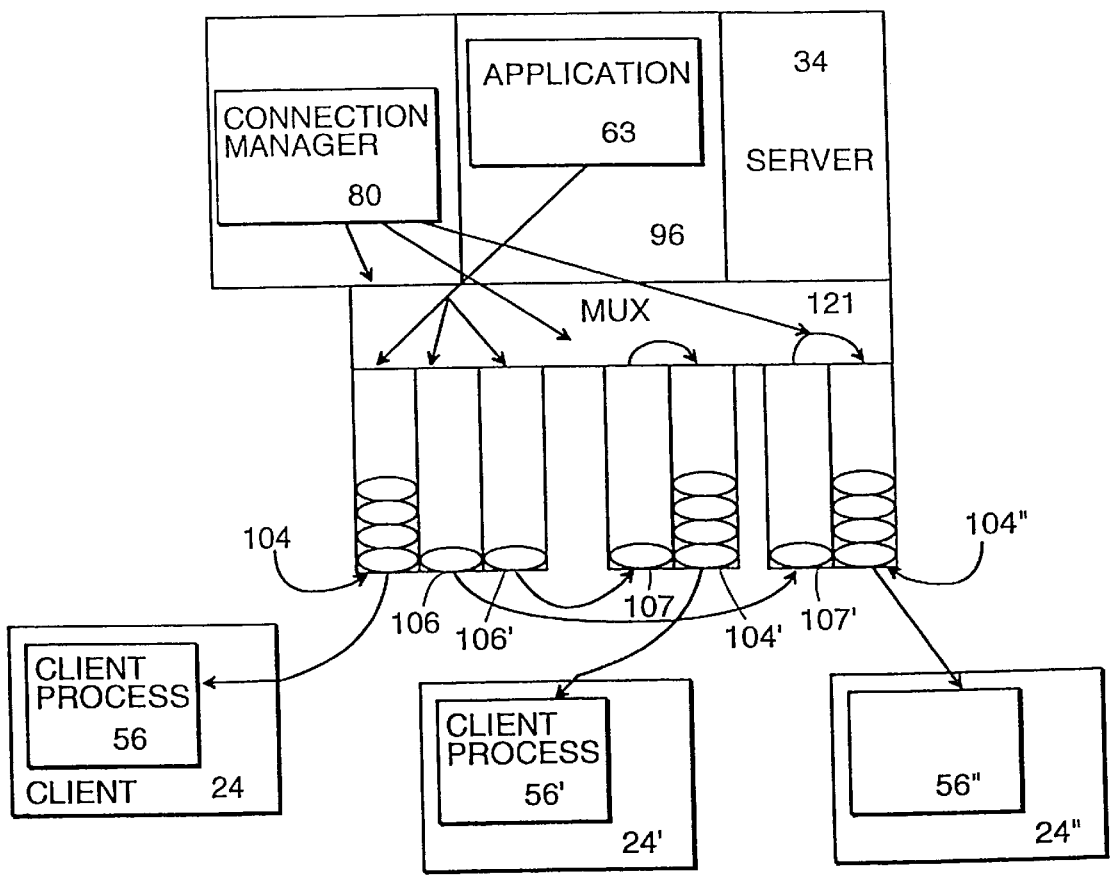
FIG. 6 is a block diagram of an embodiment of the invention depicting the use of a multiplexer to transmit the same data from an application to more than one client.

Referring to FIG. 6, it should be noted that any client 24, 24', 24", or in fact, all the clients (generally 24) attached to server 34 with the application 63 may be another server 34', 34". In this manner, data transmitted by the application 63 is sent to other servers prior to being sent to client nodes 24. In this manner, data transmitted by the application 63 is transmitted to an ever increasing number of client nodes as this network fans out.

When each client 24 terminates its connection with the server 34, each client protocol stack (generally 104) and its associated minimal stack (generally 107) is destroyed. Similarly, the minimal protocol stack (generally 106) associated with the first client protocol stack 104 is also destroyed. When the last of the minimal 107 and second (and subsequent) client protocol stacks 104 has terminated, the configuration is as it was initially with only a first client communications protocol stack 104 associated with the execution environment 96. Note that until all the second and subsequent client protocol stacks 104 are terminated, the first client protocol stack 104 may not be destroyed, even if the first client 24 is no longer present.

As shown in FIG. 2, each execution environment 96 communicates with each protocol stack 104 through a multiplexer 121, 121', 121". Now referring also to FIG. 6, with the present invention it is possible for more than one client to receive data being transmitted to the first client 24, for example, in order to shadow or monitor the transmission of data from a server 34 or to broadcast data from a specialized broadcast application, such as a stock quotation application, from which the same data is broadcast or transmitted substantially simultaneously to a number of clients (generally 24).

In such a case, the first client 24 causes the specialized application 63 to execute and transmit its data to the client 24 as discussed previously. When a second client 24' requests access to the broadcast application 63, the connection manager 80 begins to construct the protocol stack 104' for the second client 24' aspreviously discussed with regard to the first client 24. However, because the application 63 is a broadcast application, the connection manager 80 recognizes that it need not start an additional execution environment 96 and instead takes the steps necessary to send the data from the broadcast application 63 to the second client 24' and any additional clients 24".

First, the connection manager 80 creates a first minimal communications protocol stack 106 which it associates with a communications protocol stack 104 of the first client 24. The connection manager 80 next creates a second minimal protocol stack 107 and associates it with the communications protocol stack 104' of the second client 24'. As each additional client 24" requests access to the broadcast application 63, another minimal protocol stack 106' is created and associated with the first client protocol stack 104 and another minimal protocol stack 107' and client protocol stack 104" is created for each new client 24". The first client protocol stack 104 and all the minimal protocol stacks 106, 106' associated with the first client protocol stack 104, and each pair of client protocol stacks 104', 104" and minimal protocol stacks 107, 107' associated with each additional client 24', 24" are in communication by way of a multiplexer 121.

When multiplexer 121 is directing data to or receiving data from only one client 24, the multiplexer 121 is acting as a simple pass-through device. However, when there is more than one client 24, 24', 24" receiving data from or transmitting data to a single application 63, each multiplexer (generally 121) takes on two additional configurations. In one configuration, the multiplexer 121 is configured to send application data to or receive data from both the first client protocol stack 104 and each of the minimal communications protocol stacks 106, 106' associated with it. In the second configuration the multiplexer 121 is configured to send data received by the minimal protocol stack 107, 107' to the client protocol stack 104', 104", respectively, associated with it. In this embodiment, the mux 121 may receive input data directly from each client protocol stack 104, 104', 104".

The connection manager 80 connects the minimal protocol stacks 106, 106' associated with the first client 24 with the minimal protocol stacks 107, 107' respectively, of the second 24' and subsequent clients 24" and instructs the multiplexer 121 to direct output from the application 63 to the communications protocol stack 104 of the first client 24 and its associated minimal protocol stacks 106, 106'. The multiplexer 121 is also instructed by the connection manager 80 to connect each second and subsequent client minimal protocol stack 107, 107' to its associated client protocol stack 104, 104', respectively. Data transmitted to the first client 24 by way of the first client protocol stack 104 is therefore also transmitted to the minimal protocol stacks 106, 106' associated with the first client 24 and hence to the second 24' and subsequent clients 24" by way of their associated protocol stacks 104', 104", respectively, and associated minimal protocol stacks 107, 107', respectively. In one embodiment, the protocol stack container includes a data structure to keep track of the number and type of protocols associated with a given application 63.

Figure 7:
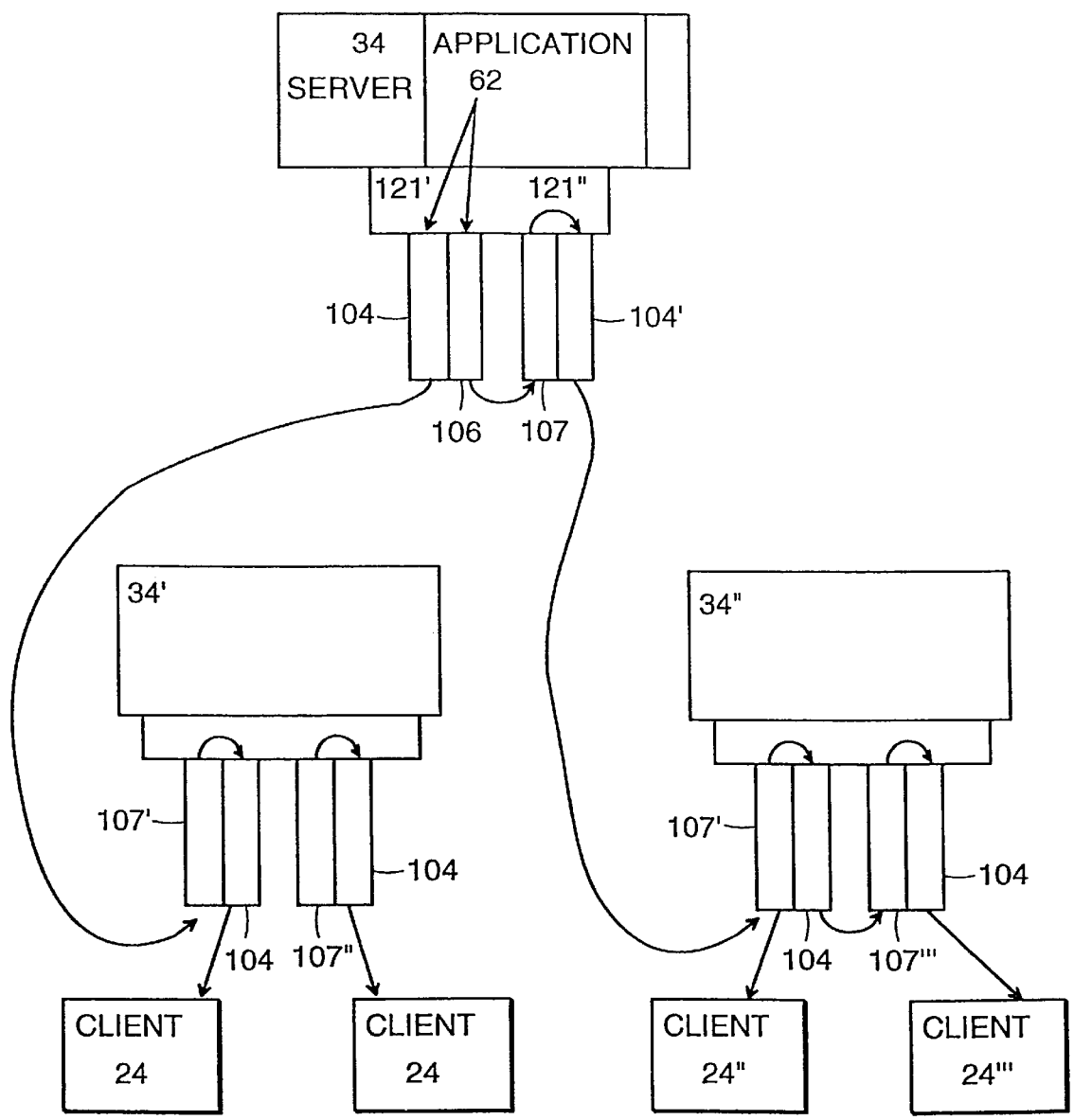
FIG. 7 is a block diagram of the embodiment of the invention in which the broadcast capabilities are increased by fan out.

Referring to FIG. 7, as discussed above, it is possible that the "clients" of one server 34 be other servers 34' and 34" (only two being shown for simplicity). The second servers 34' and 34" then transmit the data to clients (generally 24) or to additional servers. In this embodiment the output of the server protocol stack (generally 104) is connected to the protocol stacks 107' of the secondary servers 34', 34". Then as described previously, the data is transmitted between the protocol stacks and out to the clients (generally 24). In this manner the data may fan out and be distributed to many more clients than may reasonably be supported by one server.

While the invention has been particularly shown and described with reference to specific preferred embodiments, it should be understood by those skilled in the art that various changes in form and detail may be made therein departing from the spirit and scope of the invention as defined by the appended claims.

What is claimed is:

1. A method for displaying output, produced by an application executing on a server, in an HTML page, the method comprising the steps of:
   (a) transmitting a file to a client, the file representing a page and including a parameter associated with defining a window within the page when a browser application displays the page at the client;
   (b) receiving input from the page displayed at the client to signal execution of an application on a server;
   (c) creating a communications channel that is independent from the browser application between the window within the page displayed at the client and the application program executing on the server, using the window parameter; and
   (d) transmitting output produced by the application executing on the server via the communications channel to the client for displays without intervention by the browser application, in the window within the displayed page.

2. The method of claim 1 wherein step (b) comprises:
   (b-a) displaying the page on the client, the page including at least one tag for signaling execution of the application; and
   (b-b) invoking execution of the application on the server in response to the selection of the at least one tag by a user.

3. The method of claim 1 further comprising the step of accessing the file to determine the parameter of the window in which the executing application will be displayed.

4. The method of claim 1 further comprising the step of accessing the file in order to determine a parameter associated with the execution of the application.

5. The method of claim 1 wherein step (c) comprises creating a data pipe that is independent from the browser application between the executing application and the application window in the page.

6. The method of claim 1 further comprising the step of receiving input to the application executing on the server over the communication channel, the received input corresponding to input supplied to the window within the displayed page by a user of the client.

7. The method of claim 1 wherein the window is a first window and step (c) further comprises the steps of:
   defining a second window for receiving the output produced by the application program executing on the server; and associating the second window with the first window such that the output received by the second window appears in the first window within the displayed page without intervention by the browser application.

8. The method of claim 7 wherein the step of associating the second window with the first window comprises using window properties that define the first window to define the second window.

9. An apparatus for displaying output, produced by an application executing on a server, in an HTML page, the apparatus comprising:
   a page displayer displaying a page having an application execution window defined therein;
   a parameter handler which receives from the page displayer parameters associated with the application execution window within the page; and
   a network executive which receives parameters from said parameter handler, causes an application to begin execution on a server, establishes a communication channel that is independent from a browser application between the application execution window and the application executing on the server, using the received parameters, receives output produced by the application through the communication channel, and displays the output in application execution window without intervention by the browser application.

10. The apparatus of claim 9 wherein the parameter handler accesses a file storing the page to determine the parameters associated with the application execution window within the page.

11. The apparatus of claim 9 wherein another parameter received by the network executive from the parameter handler is an identification of the server which hosts the application.

12. An article of manufacture having computer-readable code means for displaying output, produced by an application executing on a server, in an HTML page embodied thereon, the article comprising:
   (a) computer readable means for transmitting a file to a client, the file representing a page and including a parameter associated with defining a window within the page when a browser application displays the page at the client;
   (b) computer-readable code means for receiving input from the page displayed at the client to signal execution of an application in an HTML page;
   (c) computer-readable code means for creating a communications channel that is independent from the browser application between the window within the page displayed on the client and the application program executing on the server, using the window parameter; and
   (d) computer-readable code means for transmitting output produced by the application executing on the server via the communications channel to the client for display, without intervention by the browser application, in the window within the displayed page.

13. A method for displaying output, produced by an application executing on a server, in an HTML page, the method comprising the steps of:
   (a) receiving input from a first page displayed at a client to signal execution of an application on a server;
   (b) determining parameters of a window within the first page in which output produced by the executing application will be displayed;
   (c) creating a communications channel that is independent from a browser application between the window within the first page and the executing application on the server, using the determined parameters;
   (d) transmitting output produced by the application executing on the server to the client for display in the window via the communications channel without intervention by the browser application;
   (e) receiving input from the client to signal display of a second page; and
   (f) storing the determined parameters associated with the first page.

14. The method of claim 13 further comprising the steps of:
   (g) receiving input from a user to redisplay the first page;
   (h) retrieving the stored parameters associated with the first page; and
   (i) redisplaying, responsive to the retrieved associated parameters, the first page including the window displaying the executing application.

15. A system for displaying output, produced by an application program executing on a server, in an HTML file comprising:
   a server which stores and executes an application program;
   a network executive which sends commands to said server to begin execution of the application program, which receives, without intervention by a browser application, output from the application program executing on said server, and which further transmits, without intervention by the browser application the application, program output;
   a parameter handler which receives parameters and passes the received parameters, to said network executive; and
   a file which includes an application window and window parameters the file providing the window parameters to said parameter handler,
   wherein the network executive establishes a communication channel that is independent from the browser application between the application program executing on the server and the application window using the window parameters, by which the application output passes from the application executing on the server to the application window without intervention by the browser application.

16. The system of claim 15 further comprising a tag which, when embedded in said file, causes the application window to be displayed which passes window parameters to said parameter handler.

17. A method for displaying output produced by an application program executing on a server in a page displayed on a client, the method comprising the steps of:
   (a) displaying a page having a window defined therein, the window being associated with an application program residing on a server;
   (b) invoking execution of the application program on the server in response to the displayed page;
   (c) creating a communications channel that is independent from the browser application between the window defined in the displayed page and the application program executing on the server in response to invoking execution of the application program; and (d) receiving output produced by execution of the application program on the server through the communications channel for display, without intervention by the browser application in the window defined within the displayed page.

18. The method of claim 15 wherein the window is a first window and step (c) further comprises the steps of:

defining a second window for receiving the output produced by the application program executing on the server; and associating the second window with the first window such that the output received by the second window appears in the first window within the displayed page without intervention by the browser application.

19. The method of claim 18 wherein the step of associating the second window with the first window comprises using window properties that define the first window to define the second window.

\* \* \* \* \*

UNITED STATES PATENT AND TRADEMARK OFFICE
CERTIFICATE OF CORRECTION

PATENT NO.      : 6,370,552 B1
DATED           : April 9, 2002
INVENTOR(S)     : Bloomfield It is certified that error appears in the above-identified patent and that said Letters Patent is hereby corrected as shown below:

<u>Title page,</u>
Item [56], References Cited, U.S. PATENT DOCUMENTS, should contain the additional text as follows:

| | | | |
|---|---|---|---|
| -- 4,877,204 | December 12, 1989 | Johnson et al. | 364/200 |
| 5,031,089 | July 9, 1991 | Liu et al. | 364/200 |
| 5,175,852 | December 29, 1992 | Johnson et al. | 395/600 |
| 5,202,971 | April 13, 1993 | Henson et al. | 395/425 |
| 5,341,477 | August 23, 1994 | Pitkin et al. | 395/200 |
| 5,526,492 | June 11, 1996 | Ishida | 395/200.09 |
| 5,557,748 | September 17, 1996 | Norris | 395/200.10 |
| 5,583,992 | * December 10, 1996 | Kudo | 395/200.03 |
| 5,838,916 | * November 17, 1998 | Domenikos et al. | 395/200.49 |
| 5,838,910 | * November 17, 1998 | Domenikos et al. | 395/200.33 |
| 5,838,906 | * November 17, 1998 | Doyle et al. | 395/200.32 |
| 5,764,908 | * June 9, 1998 | Shoji et al. | 395/200.47 -- |

FOREIGN PATENT DOCUMENTS, should contain the additional text as follows:

| | | |
|---|---|---|
| -- EP | 0 381 645 | August 8, 1990 |
| EP | 0 540 151 | May 5, 1990 |
| EP | 06332782 | December 2, 1994 -- |

UNITED STATES PATENT AND TRADEMARK OFFICE
CERTIFICATE OF CORRECTION

PATENT NO. : 6,370,552 B1
DATED : April 9, 2002
INVENTOR(S) : Bloomfield

It is certified that error appears in the above-identified patent and that said Letters Patent is hereby corrected as shown below:

<u>Title page (cont'd),</u>
OTHER PUBLICATIONS, should contain the additional text as follows:

-- "Allocation of Equivalent Communication Buffer Sizes in SQLJRA Remote Protocol", <u>IBM Technical Disclosure Bulletin</u>, Vol. 36, No. 1, January 1993, pages 29-31.
Mann, Bruce E. et al., "Terminal Servers on Ethernet Local Area Networks", <u>Digital Technical Journal</u>, No. 3, September 1986, pages 73-87.
Schemers, R.J., <u>Update</u>, September 17, 1995, pages 1-5.
* Herb Jellinek, http://199.185.96.71/java/Animator/example1.html --

Signed and Sealed this

Twenty-fourth Day of February, 2004

JON W. DUDAS
*Acting Director of the United States Patent and Trademark Office*